United States Patent [19]

Jensen et al.

[11] 4,436,486
[45] Mar. 13, 1984

[54] CIRCULATING PUMP UNIT

[75] Inventors: Niels D. Jensen, Bjerringbro; Horst Komossa, Wittenborn; Kurt F. Nielsen, Bjerringbro, all of Denmark

[73] Assignee: Grundfos A/S, Bjerringbro, Denmark

[21] Appl. No.: 272,782

[22] Filed: Jun. 11, 1981

[30] Foreign Application Priority Data

Jun. 19, 1980 [DE] Fed. Rep. of Germany ....... 3022872

[51] Int. Cl.³ .............................................. F04B 49/06
[52] U.S. Cl. ..................................................... 417/45
[58] Field of Search ...................... 417/12, 44, 45, 374, 417/410, 32; 318/771–777, 445, 806

[56] References Cited

U.S. PATENT DOCUMENTS

| 1,752,892 | 4/1930 | Cumberland | 417/45 X |
| 1,920,749 | 8/1933 | Hutt | 417/45 X |
| 1,952,299 | 3/1934 | Valkenburg | 417/12 |
| 3,069,068 | 12/1962 | Hansen | 417/45 |
| 4,030,009 | 6/1977 | Halsted | 318/772 |

Primary Examiner—Edward K. Look
Attorney, Agent, or Firm—Michael N. Meller

[57] ABSTRACT

A circulating pump unit comprising a pump and a motor for heating and service water installations, in which the motor is settable to at least two different speeds of rotation by means of a rotation speed switch. According to the invention the motor (1) couples automatically and independently of the operational speed (n) set on the rotation speed switch (3), after switching off or switching on of the unit by means of a start-up switch (5) overriding pg,2 the rotation speed switch to the rotation speed (n3) with maximum start-up moment (M3) and starts at this rotation speed and after a predetermined time switches over to the operational rotation speed set on the rotation speed switch. Thereby the circulating pump unit will give a reliable start of the pump also after a standstill for a long time.

3 Claims, 2 Drawing Figures

CIRCULATING PUMP UNIT

BACKGROUND OF THE INVENTION

1. Field of the Invention

The invention relates to a circulating pump unit, consisting of a pump and a motor, for heating and service water installations, in which the motor is settable to at least two different speeds of rotation by means of a rotation speed switch.

2. Description of the Prior Art

As is known, the operating point of a heating or service water installation is determined by the point of intersection between the mains characteristic line and the constriction curve. Circulating pump units to adapt the pump to the systems may be adapted without loss and to save electric drive power have been constructed. With these relatively small motors the variation of the speeds of rotation takes place by series and/or parallel connection of the main and auxiliary windings of the motor. The desired connection is established by means of the rotation speed switch which in general is installed in the terminal box of the pump motor.

Such pumps with selectable rotation speeds have great advantages in view of the fact that they can be driven at low speed in an energy-saving manner during the greatest part of the working time, but they have the serious disadvantage that starting up of the unit is not always guaranteed when the low rotation speed is set.

SUMMARY OF THE INVENTION

In accordance with the present invention a circulating pump unit comprising a pump and motor for heating and service water installation is provided. The unit is setable to at least two rotational speeds by means of a rotation switch. The pump motor is controlled independently of the rotational speed set on the switch during start up to overide the rotational speed set on the switch and to be operated with maximum start up moment. This acts to overcome the initial reluctance of a pump containing, for example, settled solids to turn during start up.

BRIEF DESCRIPTION OF THE DRAWINGS

The objects and advantages of the invention will become apparent from the appended drawings in which.

DESCRIPTION OF THE PREFERRED EMBODIMENTS

Figure 1:
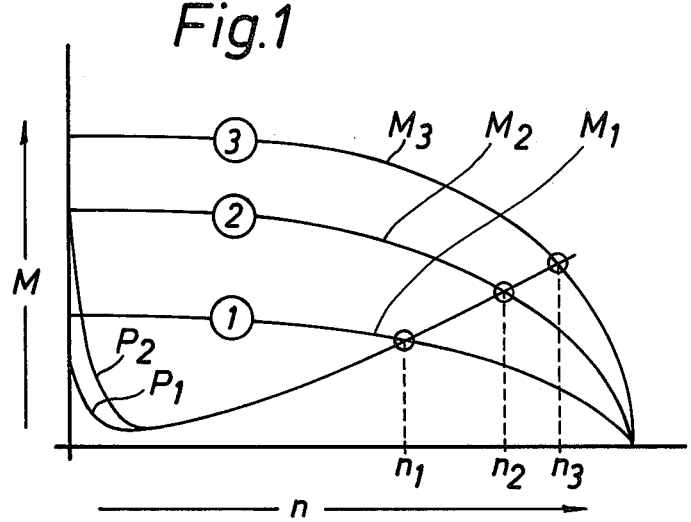
FIG. 1 is a graph of various operating parameters of the motor and pump of the circulating pump unit.

The problems involved here become clear if one considers the facts represented in FIG. 1. In this diagram the curves marked as M3, M2 and M1 show the torque course M of the pump motor in response to the speed of rotation n for the three positions of the rotation speed switch. These positions are indicated in the illustration by the digits enclosed in circles. If the main and auxiliary windings of the motor are connected in parallel (switch position 3), then the motor moment and also the power consumption are at the maximum. In case of a series connection of main and auxiliary windings (switch position 1) the motor moment and the power consumption are low. Finally in case of a combined series and parallel connection of the windings (switch position 2) the motor moment and power consumption lie at corresponding middle values. The measures and functions of circuitry necessary in this connection are known per se and therefore do not need to be explained in detail.

The curves P1 and P2 in FIG. 1 show the course of moments of a centrifugal pump as a function of the rotation speed n. The curve P1 is to be regarded as "normal curve". It shows that at zero rotation speed a certain "initial breakaway moment" is required and that the moment, after reaching the minimum, takes a parabolic course. Since in this case under consideration the pump moment P1, at zero rotation speed, lies below the motor moment M, reliable starting up of the unit is possible. The difference in each case between the curves M and P represents the acceleration moment, which becomes zero at the intersection point of the two curves, that is the operating point.

If the pump unit is switched off, then the dirt particles present in the water circuit settle in the bearings and on the rotor of the motor, especially in the case of a lengthy stoppage time. Thus according to experience the friction in the bearings and between the rotor circumference and the gap tube increases, so that the pump moment after a certain stoppage time, for example when the circulating pump is switched off during the summer, could have the course of the curve P2. FIG. 1 illustrates that a starting up of the motor is not possible in the switch position for torque M1, due to the fact that the pump moment P2 at n=0 is greater than the motor moment M1. There may be difficulties in starting even in the switch position for the moment M2.

It is possible to unblock the pump unit manually. However, for this purpose a housing plug must usually be removed to make the shaft of the pump accessible. In this case it is disadvantageous that water escapes and that an inexpert operator of the heating system is unable to carry out the start-up of the rotor.

The invention is based upon the problem of eliminating the indicated start-up difficulties of the circulating pump, that is of guaranteeing reliable starting inter alia even after a lengthy stoppage time.

To solve this problem, the initially mentioned pump unit is formed according to the invention so that the pump motor, independently of the working rotation speed set on the rotation speed switch, after switching off or on switching on of the unit, is automatically switched, by means of a start-up switch overriding the rotation speed switch, to the rotation speed with the highest start-up moment, started up at this rotation speed and switched over after a predetermined time to the operating rotation speed set on the rotation speed switch. The operation of switching over to the highest start-up moment will of course not proceed if the motor is already set with its rotation speed switch to the rotation speed with the highest moment. An overriding of the rotation speed switch would also be cancelled.

The start-up switch 5 will expediently be controlled in response to a specific operational value of the motor of the pump. Thus the start-up switch could have a temperature-sensing means 6 associated therewith, thereby forming a thermostat 7, and the temperature field of the pump motor could serve as switching value or operational value. If the pump unit is switched off, the motor temperature in time drops to the ambient temperature. On dropping below a pre-selected switching temperature, for example 30° C., the thermostat switches the current circuit of the motor, by-passing the rotation speed switch, to the maximum speed of rotation. Then the pump unit will be started up at this rotation speed. The motor temperature finally rises again. When the 30° C., assumed in the example, are exceeded the thermostat springs over and switches to the operational rotation speed set by means of the rotation speed switch.

The start-up switch 5 can also be a relay which drops off on switching off of the motor and the circuit of which connects to the rotation speed with the highest start-up moment and, after renewed switching on of the motor, switches over with delay to the rotation speed set with the rotation speed switch, and thus in doing so eliminates the preceding overriding of the rotation speed switch. The pull-up delay time of this relay could lie at about 10 sec., if it is to be assumed that a motor blocked by any deposits will have worked itself free within this time.

As start-up switch there could also be considered a thermal relay, for example, a bimetallic strip provided with a heater winding, with the winding lying in the current circuit of the pump motor, that is influenced by the consumed motor current as operational value. The bimetallic strip can here act upon an ordinary spring switch and influence the switching operation after a certain heat-up time of the winding.

Other switching elements which can process other operational values of the motor, beside the operational values mentioned, along the lines of the invention can also be used as start-up switches.

The special advantage of a circulating pump unit constructed in accordance with the invention lies in the fact that it can be operated in an energy-saving manner at low rotation speed, but in every case possesses certainty of starting by reason of the starting up of the motor with the maximum torque. Thus start-up problems in pumps of selectable rotation speed are eliminated in this way, so that the otherwise frequently unexploited possibilities of energy-saving can now be fully utilised.

Figure 2:
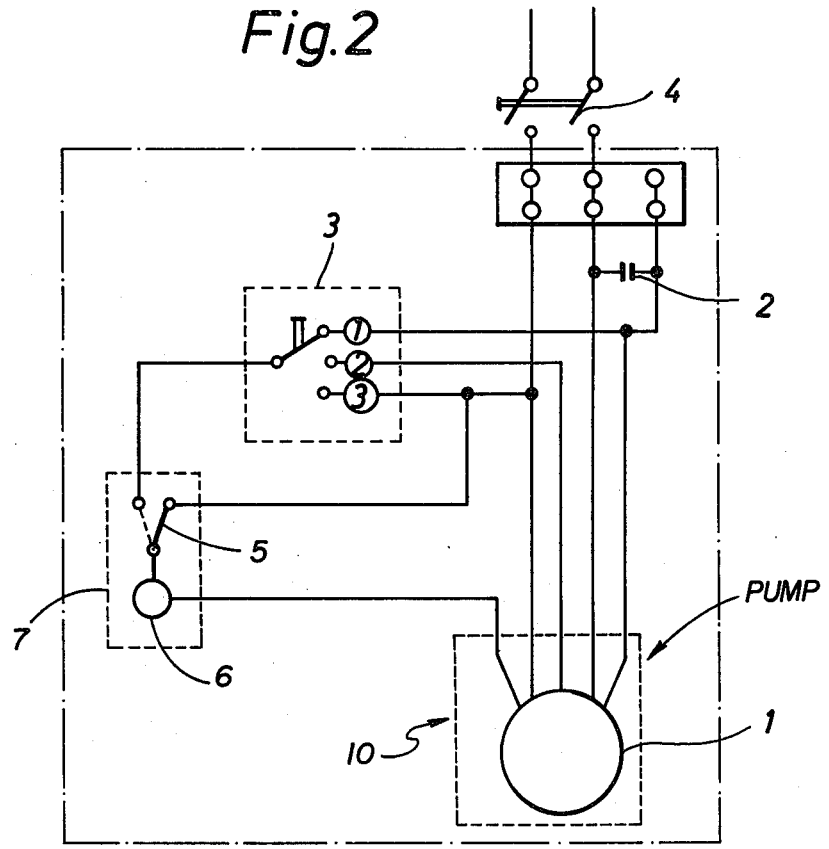
FIG. 2 is a schematic diagram of a pump driving system constructed in accordance with the present invention.

In FIG. 2 there is represented diagrammatically a circuitry example of embodiment of the invention. The drawing shows a single-phase motor 1 which is part of the circulating pump and motor unit 5 with the usual motor operating capacitor 2 and the rotation speed switch 3 by which, according to the illustration, the lowest rotation speed n1 is set as operating rotation speed. When the mains switch 4 is open and thus the current supply to the unit is interrupted the start-up switch 5, formed for example as electro-magnetic relay, lies in the dropped-off position as shown, which it also initially retains on switching on of the motor, on account of the predetermined pull-up delay. In this position thus the start-up switch 5 overrides the rotation speed switch 3 in such manner that the motor windings are deliberately switched to the rotation speed n3, independently of the switch 3.

After the shifting over of the switch 4 the motor 1 will start up with the rotation speed n3 and the highest torque M3. After this start-up operation the pull-up-delayed relay 5 springs with its switch contact over into the position shown in chain lines, so that the unit now will continue to run with the rotation speed n1 set on the rotation speed switch. A change of speed of rotation would understandably also take place if the switch 3 were previously switched to rotation speed n2. Moreover naturally no change of rotation speed will take place if the rotation speed switch 3 is situated in the switch position for rotation speed n3.

As already mentioned, in place of a relay with delayed pull-up a thermal relay or other switch elements influenceable by specific operational values could also be used. The sole decisive point is the requirement that after or with switching off or on switching on of the unit, the rotation speed switch is overridden in its actual rotation speed switching function and in every case the pump motor starts up with the maximum torque.

In conclusion it should also be mentioned that the rotation speed switch 3 and the start-up switch 5 do not necessarily have to be two separate units, since the two switches could also form one constructional and functional unit. Thus likewise one single switch could take over both functions as one unit. This could be realised relatively simply in a pump unit having two rotation speeds.

We claim:
1. A circulating pump system, comprising:
 (a) a motor capable of operating in a plurality of operating modes, including at least a highest moment mode and a lowest moment mode, said motor having a current circuit;
 (b) a pump mechanically connected to and driven by said motor;
 (c) a rotation speed switch having an input terminal and a plurality of output terminals, each of said output terminals corresponding to one of said operating modes such that when one of said output terminals is electrically connected to said input terminal, said motor operates in said corresponding mode;
 (d) a plurality of output leads, each of said output leads being electrically connected at one end to one of said output terminals and in turn corresponding to one of said operating modes; and
 (e) a thermostat having a temperature-sensing means and a start up switch operatively connected to said temperature-sensing means, said start up switch being responsive to a predetermined temperature condition in said motor, said predetermined temperature condition occurring only when said motor is stopped, said start up switch having a response to the detection of said predetermined temperature condition by said temperature-sensing means, said response being to override said rotation speed switch by electrically connecting said current circuit to that one of said leads which corresponds to said highest moment mode, thereby placing said motor in said highest moment mode and bypassing said rotation speed switch, and then in response to the cessation of said predetermined temperature condition, to cease overriding said rotation speed switch by electrically connecting said current circuit to said input terminal, thereby placing said motor in the mode corresponding to that one of said output terminals which is electrically connected to said input terminal.

2. A circulating pump system as claimed in claim 1, wherein said start up switch comprises a relay.

3. A circulating pump system as claimed in claim 1, wherein the operation of said start up switch is independent of the rotational speed of said motor.

* * * * *